United States Patent
Grover, Jr. et al.

(10) Patent No.: US 9,365,208 B2
(45) Date of Patent: Jun. 14, 2016

(54) METHOD AND APPARATUS FOR VEHICLE CREEP INTERRUPTION

(71) Applicant: GM GLOBAL TECHNOLOGY OPERATIONS LLC, Detroit, MI (US)

(72) Inventors: Ronald O. Grover, Jr., Ann Arbor, MI (US); Tang-Wei Kuo, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 21 days.

(21) Appl. No.: 14/320,000

(22) Filed: Jun. 30, 2014

(65) Prior Publication Data
US 2015/0375731 A1   Dec. 31, 2015

(51) Int. Cl.
*B60W 10/18* (2012.01)
*B60W 10/184* (2012.01)
*B60W 10/196* (2012.01)
*B60W 10/192* (2012.01)
*B60W 10/06* (2006.01)

(52) U.S. Cl.
CPC .............. *B60W 10/18* (2013.01); *B60W 10/06* (2013.01); *B60W 10/184* (2013.01); *B60W 10/192* (2013.01); *B60W 10/196* (2013.01); *B60W 2540/00* (2013.01); *B60W 2540/26* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 2010/0222976 A1* | 9/2010 | Haug | B60K 28/04 701/70 |
| 2012/0055744 A1* | 3/2012 | Chen | B60T 8/267 188/106 P |
| 2013/0066525 A1* | 3/2013 | Tomik | B60K 28/04 701/45 |

* cited by examiner

*Primary Examiner* — John R Olszewski
*Assistant Examiner* — Gerrad A Foster

(57) ABSTRACT

A method for controlling a vehicle employing a powertrain system and a braking system coupled to vehicle wheels includes interrupting vehicle creep operation upon detect absence of a qualified operator in a driver's seat when the vehicle is in a propulsion state.

18 Claims, 2 Drawing Sheets

METHOD AND APPARATUS FOR VEHICLE CREEP INTERRUPTION

TECHNICAL FIELD

This disclosure is related to control of propulsion for motorized vehicles.

BACKGROUND

The statements in this section merely provide background information related to the present disclosure. Accordingly, such statements are not intended to constitute an admission of prior art.

Powertrain architectures for vehicles include powertrain systems that employ either one or multiple torque-generative devices including internal combustion engines and non-combustion torque machines that generate and transmit mechanical torque either directly or via a transmission device to a driveline for use as propulsion torque. A vehicle generates propulsion torque when the vehicle is commanded on via an ignition key and the transmission is in a propulsion gear, such as may occur when a transmission range selector (PRNDL) is manipulated to a propulsion gear, e.g., drive (D) or reverse (R).

SUMMARY

A method for controlling a vehicle employing a powertrain system and a braking system coupled to vehicle wheels includes interrupting vehicle creep operation upon detect absence of a qualified operator in a driver's seat when the vehicle is in a propulsion state.

BRIEF DESCRIPTION OF THE DRAWINGS

One or more embodiments will now be described, by way of example, with reference to the accompanying drawings, in which.

DETAILED DESCRIPTION

Figure 1:
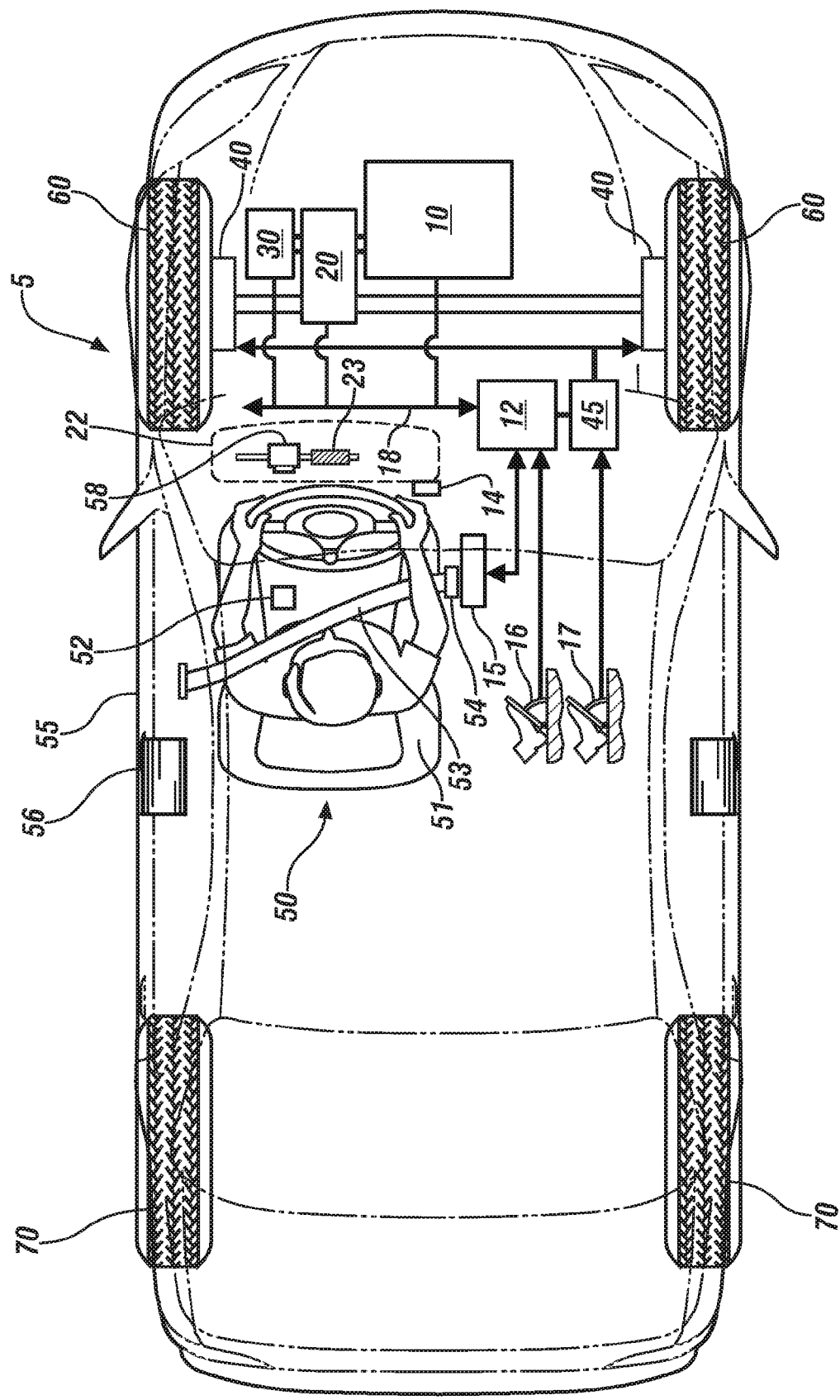
FIG. 1 illustrates a vehicle including a powertrain system controlled by a controller, in accordance with the disclosure.

Referring now to the drawings, wherein the showings are for the purpose of illustrating certain exemplary embodiments only and not for the purpose of limiting the same, FIG. 1 illustrates an embodiment of a vehicle 5 including a powertrain system coupled to a driveline and controlled by a control system. The vehicle 5 is configured as a four-wheel, front-wheel drive passenger vehicle including a hybrid powertrain system that employs an internal combustion engine (engine) 10, transmission 20 and an electrically-powered torque machine 30. This disclosure may be employed on other vehicle and powertrain configurations, including non-passenger car configurations and non-hybrid powertrain configurations. Like numerals refer to like elements throughout the description.

The powertrain system includes the engine 10 and electrically-powered torque machine 30 that generate torque for transfer to transmission 20, which can be a multi-gear transaxle device that transfers torque to drive wheels 60 via half-shafts. A controller 12 signally connects to the engine 10, torque machine 30 and transmission 20 via communications bus 18 to monitor and control operation of each, including controlling operation to generate and transfer torque in response to an operator torque request. The drive wheels 60 and non-drive wheels 70 are equipped with controllable friction brakes 40 that are controlled by a brake controller 45. The brake controller 45 signally connects to the controller 12, and may be configured as a mechanical controller for controlling a hydraulic braking system, or an electro-mechanical controller for providing traction control and other functionality associated with controlling a hydraulic braking system, or an electronic controller for controlling electric brakes, or another suitable controller. The vehicle is mechanized with a parking brake that may be mechanically activated and deactivated with a foot pedal or lever, or may be electrically activated and deactivated with a suitable actuator.

A passenger compartment of the vehicle 5 includes a driver's area 50 including a driver's seat 51 on which a vehicle operator sits to operate the vehicle, and an adjacent driver's door 55. The driver's area 50 includes a plurality of human/machine interface devices through which the vehicle operator commands and controls operation of the vehicle 5, including a steering wheel, driver information center 22, an occupant restraint system including a seatbelt 53, an accelerator pedal 16, a brake pedal 17, a transmission range selector (PRNDL) 15, and an ignition switch 14.

The ignition switch 14 includes several states, including an OFF state, an ON state, a START state, and an accessory (ACC) state in one embodiment. A vehicle operator commands the ignition switch 14 to one of the aforementioned states by physically manipulating a key or activating an analogous electronic or electromechanical device, thus controlling vehicle operation. The vehicle operator selects a transmission range and preferred direction of vehicle travel (if any) using the transmission range selector 15. The vehicle operator directs operation of the vehicle 5 to one of the ON state and the OFF state using the ignition switch 14. The vehicle operator uses the accelerator pedal 16 to provide an acceleration request and the brake pedal 17 to provide a braking request.

The driver information center 22 includes a plurality of devices through which pertinent vehicle operating information is conveyed to the vehicle operator and through which control of individual vehicle functions may be controlled by the vehicle operator. The driver information center 22 includes a vehicle instrument panel that includes, e.g., a speedometer, odometer, fuel gage, malfunction indicator lamps and the like. The driver information center 22 may also include a user interface 23 that includes a display screen and/or one or a plurality of indicator lamps and user input devices in the form of a touch screen or another suitable configuration. In one embodiment, the user interface 23 includes a multi-touch screen, which is a processor-controlled visual display device having a touch-sensitive functionality that includes a mapped function that is responsive to tactile input. The multi-touch screen can also include an in-vehicle touch-sensitive audio-visual interactive display device in one embodiment. A user is able to interact with displayed items by employing tactile input to manipulate an on-screen image. In one embodiment, the multi-touch screen can be a mutual capacitive display device or a liquid crystal display (LCD) device configured to receive user inputs. Other suitable multi-touch screen display devices may be employed without limitation. The user interface 23 may include a dashboard lamp that can be illuminated or displayed on the multi-touch screen to indicate that vehicle creep interruption has been undertaken by the controller 12, including a capability to countermand the vehicle creep interruption routine. An embodiment of a vehicle creep interruption routine that includes indicating to the vehicle operator that vehicle creep interruption has been undertaken by the controller 12 is described with reference to FIG. 2. Other human/machine interface devices can include those associated with vehicle cruise control operation, HVAC, infotainment, and seat location, among others.

The driver's area 50 is configured with a sensing system to detect presence or absence of an occupant in the driver's seat, including in one embodiment detecting whether the occupant in the driver's seat is qualified to operate the vehicle employing input from one or more of the sensors described herein. The driver sensing system can include a single of one or a combination of a seat sensor 52, a seatbelt sensor 54, a driver's door sensor 56 and a digital visioning system that includes a camera 58. The seat sensor 52 preferably includes one or more of a mass, displacement or thermal sensing device that is configured to verify the vehicle operator's presence in the driver's seat 51. The seatbelt sensor 54 is configured to verify that the seatbelt 53 is properly engaged when the vehicle operator occupies the driver's seat 51. The driver's door sensor 56 verifies that the driver's door 55 is closed completely. The camera 58 or a similar device detects presence of the vehicle operator for purposes of verifying identification or otherwise interacting with the vehicle operator, preferably including a data analysis routine to generate a signal to verify that a vehicle operator presently occupies the driver's seat 51. The camera 58 or a similar device may also be configured to detect direction of the vehicle operator's eye-gaze. Each of the aforementioned sensing systems can be any suitable combination of sensors and control routines to generate signals that can be employed by a control routine as described with reference to FIG. 2.

The illustrated vehicle may be configured to operate in one of an electric vehicle (EV) mode, a hybrid vehicle (HV) mode and an internal combustion engine (IV) mode. Operating the vehicle in the EV mode includes generating all propulsion torque from the torque machine 30, which is driven by electric or other non-combustion power. Operating the vehicle in the HV mode includes generating the propulsion torque from both the engine 10 and the torque machine 30. The engine 10 may execute autostart and autostop control routines during operation in the HV mode and the EV mode. Operating the vehicle in the IV mode includes one or more operating states wherein all propulsion torque is generated by the engine 10.

The engine 10 is preferably a multi-cylinder direct fuel injection internal combustion engine that converts fuel to mechanical power through a combustion process. The engine 10 is equipped with a plurality of sensing devices and actuators configured to monitor operation and deliver fuel to form a combustion charge to generate torque. The engine 10 may be configured to execute autostart and autostop control schemes during ongoing operation of the vehicle. By way of definition, the engine 10 is considered to be in an OFF state when it is not being fueled and is not spinning. The torque machine 30 includes a multi-phase electric motor/generator electrically connected to an inverter module that is configured to convert electric energy to mechanical power and convert mechanical power to electric energy that may be stored in an energy storage system. A single torque machine 30 is illustrated. Other embodiments may employ multiple torque machines. Alternatively, other embodiments may employ only an internal combustion engine and may not employ a torque machine. Alternatively, other embodiments may employ only a torque machine. The transmission 20 preferably includes any suitable device that effects torque transfer between the engine 10, the torque machine 30, the transmission 20 and the drive wheels 60. The transmission 20 may be configured to operate in a fixed-gear mode, a continuously variable mode, or another suitable transmission mode.

The communications path 18 includes high-speed data transfer lines to effect communications between various elements of the vehicle, and may include one or more of a direct connection, a local area network bus, a serial peripheral interface bus and a high-speed communications bus 18. The embodiment of the vehicle including the powertrain system 20 is illustrative. The controller 12 signally connects to accelerator pedal 16, brake pedal 17, transmission range selector (PRNDL) 15, and ignition switch 14 to determine an operator torque request.

The functions described as being performed by the controller 12 may be combined into one or more devices, e.g., implemented in software, hardware, and/or application-specific integrated circuitry (ASIC) and ancillary circuits that are separate and distinct from the controller 12. Information transfer to and from the controller 12 may be accomplished using communications paths including, e.g., communications bus 18. The controller 12 signally and/or operatively connects to the sensing devices of each of the torque machine 30, the engine 10 and the transmission 20 via the communications bus 18 to monitor and control operation and determine parameters thereof. The communications path 18 includes high-speed data transfer lines to effect communications between various elements of the vehicle, and may include one or more of a direct connection, a local area network bus, and a serial peripheral interface bus, and include a high-speed communications bus 18.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The controller has a set of control routines executed to provide the desired functions. Routines are executed, such as by a central processing unit, and are operable to monitor inputs from sensing devices and other networked controllers, and execute control and diagnostic routines to control operation of actuators. Routines may be executed at regular intervals, example each 100 microseconds, 3.125, 6.25, 12.5, 25 and 100 milliseconds during ongoing engine and vehicle operation. Alternatively, routines may be executed in response to occurrence of an event.

The controller 12 executes routines to control operation of the engine 10 in coordination with the torque machine 30 and the transmission 20 to generate an output torque and output speed to generate axle torque in response to the operator acceleration request and the operator braking request. The axle torque is either a positive (propulsion) torque or a negative (regenerative braking) torque. One of the control routines provides creep operation to control operation of the torque-generative devices, i.e., the engine 10 and the torque machine 30 to generate a magnitude of axle torque referred to as a creep torque, which is a magnitude of axle torque that is commanded when the operator acceleration request 16 is zero, the transmission range selection 15 is one of the drive ranges, e.g., drive (D) or reverse (R), and the vehicle speed is less than a speed threshold associated with creep operation, which is at or near 5 MPH (8 km/h) in one embodiment.

Figure 2:
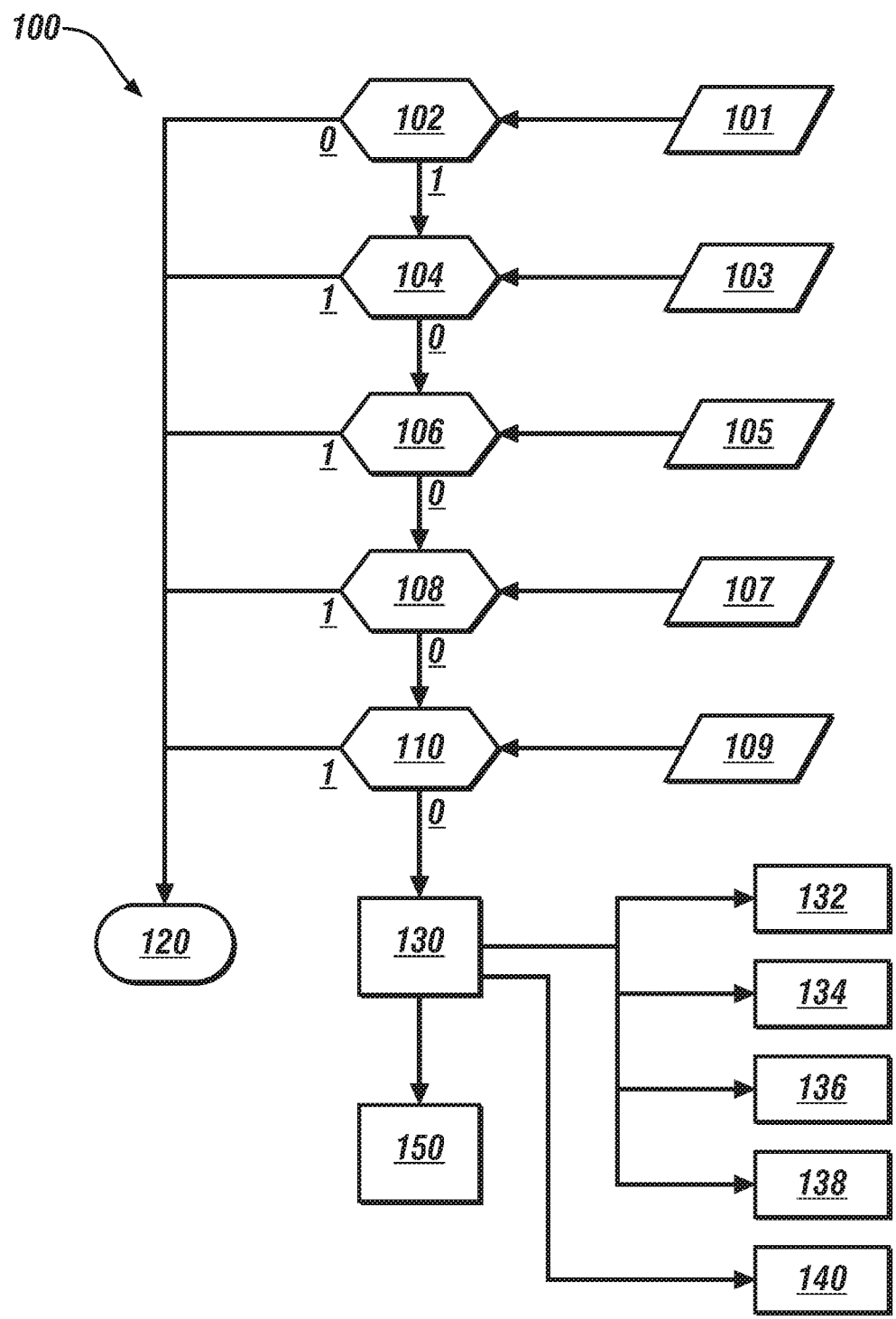
FIG. 2 illustrates a vehicle creep interruption routine for controlling the vehicle of FIG. 1, in accordance with the disclosure.

FIG. 2 schematically illustrates a vehicle creep interruption routine 100 to determine whether to undertake an action to interrupt vehicle creep that includes controlling operation of the vehicle system of FIG. 1. The vehicle creep interruption routine 100 is employed to control a vehicle system in a manner that interrupts creep torque operation and stops vehicle propulsion when one or more parameters fails to indicate a suitable operator occupies a vehicle driver's seat. Table 1 is provided as a key to FIG. 2 wherein the numerically labeled blocks and the corresponding functions are set forth as follows.

TABLE 1

| BLOCK | BLOCK CONTENTS |
|---|---|
| 101 | Vehicle ignition monitor |
| 102 | Is vehicle ignition in ON state? |
| 103 | Driver seat monitor |
| 104 | Is driver seat occupied? |
| 105 | Parking brake monitor |
| 106 | Is parking brake set? |
| 107 | PRNDL monitor |
| 108 | Is PRNDL in P or N? |
| 109 | Override monitor |
| 110 | Is override activated? |
| 120 | Discontinue vehicle creep interruption Permit creep torque activation routine(s) |
| 130 | Disable/interrupt vehicle propulsion |
| 132 | Apply brake |
| 134 | Disable electric motor propulsion |
| 136 | Shut off engine |
| 138 | Lock transmission into non-propulsion state |
| 140 | Alert operator - Illuminate dash light |
| 150 | Override disabled vehicle propulsion |

Several parameters are monitored in routine 100, including a vehicle ignition monitor 101, a driver's seat monitor 103, a parking brake monitor 105, a transmission range selector monitor 107 and an override monitor 109. The monitored parameters are employable to permit or interrupt vehicle creep operation. Each of the vehicle ignition monitor 101, driver's seat monitor 103, parking brake monitor 105, transmission range selector monitor 107 and override monitor 109 may be employed in other vehicle control routines and thus may be monitored and updated at different rates. Thus, monitoring of the parameters may be sequentially executed in the order shown, sequentially executed in another order, executed in parallel, or executed otherwise. The parameters are monitored to determine whether vehicle creep operation is appropriate, or alternatively, whether there is a need to interrupt vehicle creep operation because the vehicle is commanded to operate in a propulsion state without benefit of an operator seated in the driver's seat and without an override. Thus, other suitable parameters may be monitored that provide similar indicators that an operator is in the driver's seat and/or an override is in place.

The vehicle ignition monitor 101 includes sensors and/or control routines that monitor an operator command for vehicle operation as indicated by a position of an ignition switch, e.g., ignition switch 14 shown with reference to FIG. 1. In one embodiment, the ignition switch 14 can be in one of several operator-commanded states, including an OFF state, an ON state, a START state, and an accessory (ACC) state. The ON state indicates that an operator has enabled vehicle operation in a manner that can lead to vehicle propulsion, and the OFF, START and ACC states indicate that the operator has not enabled vehicle operation in a manner that can lead to vehicle propulsion. State of the ignition switch is periodically monitored (102). When the ignition switch is not in the ON state (102)(0), there is no possibility that vehicle creep routine (s) can be activated, and thus there is no further need to consider executing routine(s) to interrupt vehicle creep (120) this iteration. When the ignition switch is in the ON state (102)(1), there is a possibility that vehicle creep routine(s) can be activated, and thus there remains a need to consider interrupting vehicle creep in view of other parameters.

The driver's seat monitor 103 employs sensors alone or in combination with routines to detect presence or absence of a qualified operator in the driver's seat. As shown with reference to FIG. 1, this can include input from one or more of the seat sensor 52, seatbelt sensor 54, and digital visioning system including camera 58. The camera 58 or a similar device may detect direction of the vehicle operator's eye-gaze, which may be monitored to verify that the vehicle operator is looking in the direction of the vehicle travel and thus attentive to such travel. State of the driver's seat monitor 103 is periodically updated (104). When the driver's seat monitor 103 indicates presence of a qualified operator in the driver's seat, and in one embodiment verifies that the vehicle operator is looking in the direction of the vehicle travel (104)(1), vehicle creep routines are permitted to be activated, and thus there is no further need to consider executing routine(s) to interrupt creep torque (120) this iteration. When the driver's seat monitor 103 indicates absence of a qualified operator in the driver's seat or indicates that the vehicle operator is not looking in the direction of the vehicle travel (104)(0), there is a possibility that vehicle creep torque can be activated, and thus there remains a need to consider interrupting vehicle creep in view of other parameters.

The parking brake monitor 105 detects an engagement state of a parking brake to determine whether it has been engaged or set by the operator (106). When the parking brake monitor 105 indicates the parking brake has not been set (106)(0), vehicle creep routines may be active, and thus there remains a need to consider interrupting vehicle creep in view of other parameters. When the parking brake monitor 105 indicates the parking brake has been set (106)(1), there is no further need to consider executing routine(s) to interrupt creep torque (120) this iteration.

The transmission range selector monitor 107 monitors an operator selected transmission range to determine whether one of the propulsion states has been selected by the operator (108). When the transmission range selector monitor 107 indicates that none of the propulsion states have been selected by the operator (108)(1), there is no further need to consider executing routine(s) to interrupt creep torque (120) this iteration. When the transmission range selector monitor 107 indicates that one of the propulsion states, e.g., drive (D) or reverse (R) has been selected by the operator (108)(0), vehicle creep routines may be active, and thus there remains a need to consider interrupting vehicle creep in view of other parameters.

The override monitor 109 monitors an operator selectable switch that permits override of the vehicle creep interruption routine 100 (110). When the override monitor 109 indicates operator override (110)(1), there is no further need to consider executing routine(s) to interrupt creep torque (120) this iteration. When the override monitor 109 indicates absence of an operator override (110)(0), vehicle creep routines may be active, and thus there remains a need to consider interrupting vehicle creep in view of the other parameters that indicate that an operator is not in the driver's seat.

When the monitored parameters indicate absence of a qualified operator in the driver's seat (together with all monitored parameters indicating continuing need to consider interrupting creep torque) and an override is not in place, the routine acts to interrupt vehicle creep by commanding and executing specific steps to stop movement of the vehicle and/or disable vehicle propulsion (130). This operation is preferably executed in conjunction with alerting the vehicle operator of the occurrence of the vehicle creep interruption by illuminating a dashboard lamp and/or activating an audible alarm (140) to indicate to the vehicle operator that such steps have been executed. The audible alarm alerting the vehicle operator of the occurrence of the vehicle creep interruption can be a seatbelt alarm or another suitable audible alarm that is mechanized on-vehicle.

Stopping the vehicle may include executing a command to activate and thus apply braking, e.g., activating electrically-controlled brakes to one or more of the vehicle wheels (132) to counteract any commanded creep torque and stop movement of the vehicle. This may include activating an electric parking brake on systems so equipped. Disabling vehicle propulsion may include disabling propulsion torque from an electric motor when the vehicle is configured as a hybrid or electric vehicle (134). Such disablement may include commanding a creep torque to zero and/or commanding vehicle speed to zero, or commanding transmission operation to achieve zero output speed at an output shaft of the transmission that couples to the drive wheels. Disabling vehicle creep operation may include disabling propulsion torque by commanding the engine to an OFF state and shutting it down (136). Disabling vehicle creep operation may include disabling propulsion torque by disabling the transmission (138), which may include shifting the transmission to a non-propulsion transmission range such as Park or Neutral.

The action to stop movement of the vehicle and/or disable vehicle propulsion may be automatically discontinued when the routine senses that a vehicle operator is in the driver's seat. Alternatively, the action to stop movement of the vehicle and/or disable vehicle propulsion is countermanded when the vehicle operator executes an affirmative command to override the disabled vehicle propulsion, such as by an action of applying the brake pedal. Alternatively, the action to stop movement of the vehicle and/or disable vehicle propulsion is countermanded when the vehicle operator affirmatively commands disabling the creep override via menu prompts available through the user interface of the driver information center. Alternatively, the action to stop movement of the vehicle and/or disable vehicle propulsion is countermanded when the vehicle operator manually releases or otherwise deactivates the applied parking brake (150).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a vehicle employing a powertrain system and a braking system coupled to vehicle wheels, comprising interrupting vehicle creep operation upon detecting absence of a qualified operator in a driver's seat when the vehicle is in a propulsion state; and
countermanding said interrupting vehicle creep operation when an operator manually releases a parking brake.

2. The method of claim 1, wherein detecting absence of a qualified operator in the driver's seat comprises monitoring a driver's area of a passenger compartment for presence of the operator in the driver's seat.

3. The method of claim 2, wherein monitoring the driver's area of the passenger compartment comprises monitoring output from one of a seat sensor, a seatbelt sensor, and a visioning system including a camera.

4. The method of claim 1, wherein interrupting vehicle creep operation comprises applying the braking system sufficient to achieve zero vehicle speed.

5. The method of claim 4, wherein applying the braking system sufficient to achieve zero vehicle speed further comprises activating an electric braking system.

6. The method of claim 1, wherein interrupting vehicle creep operation comprises commanding shutoff of an internal combustion engine of the powertrain system.

7. The method of claim 1, wherein interrupting vehicle creep operation comprises commanding zero output speed from the powertrain system.

8. The method of claim 1, wherein interrupting vehicle creep operation comprises applying the braking system sufficient to achieve zero vehicle speed and commanding operation of the powertrain system to achieve zero output speed at the vehicle wheels.

9. The method of claim 1, further comprising countermanding said interrupting vehicle creep operation in response to a command to override a disabled vehicle propulsion.

10. The method of claim 1, further comprising automatically countermanding said interrupting vehicle creep operation upon detecting presence of the qualified operator in the driver's seat.

11. The method of claim 1, further comprising countermanding said interrupting vehicle creep operation when an operator affirmatively commands said countermanding.

12. Method for controlling a vehicle including a powertrain system and a braking system coupled to vehicle wheels, comprising:
monitoring a driver's area of a passenger compartment to detect absence of a qualified operator in a driver's seat; and
disabling vehicle propulsion upon detecting absence of the qualified operator in the driver's seat when a transmission range selector is in a propulsion state; and
countermanding said disabling of the vehicle propulsion when an operator manually releases a parking brake.

13. The method of claim 12, wherein disabling vehicle propulsion comprises applying the braking system sufficient to achieve zero wheel speed.

14. The method of claim 12, wherein disabling vehicle propulsion comprises commanding a powertrain shutoff operation.

15. The method of claim 12, wherein disabling vehicle propulsion comprises commanding operation of the powertrain system to achieve zero speed at the vehicle wheels.

16. The method of claim 12, wherein disabling vehicle propulsion comprises applying the vehicle brake sufficient to achieve zero wheel speed and commanding a powertrain shutoff operation to achieve zero speed at the vehicle wheels.

17. The method of claim 12, further comprising enabling vehicle propulsion in response to a command to override the disabled vehicle propulsion.

18. The method of claim 12, further comprising countermanding said disabling of the vehicle propulsion upon detecting presence of the qualified operator in the driver's seat.

* * * * *